United States Patent
Lim (10) Patent No.: US 11,816,293 B2
(45) Date of Patent: Nov. 14, 2023

(54) TOUCH SENSING APPARATUS, TOUCH SENSING DISPLAY SYSTEM INCLUDING THE SAME, AND TOUCH SENSING METHOD

(71) Applicant: LX Semicon Co., Ltd., Daejeon (KR)

(72) Inventor: Yang Been Lim, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 17/713,988

(22) Filed: Apr. 5, 2022

(65) Prior Publication Data

US 2023/0127397 A1  Apr. 27, 2023

(30) Foreign Application Priority Data

Oct. 26, 2021 (KR) .......................... 10-2021-0143413

(51) Int. Cl.
*G06F 3/041* (2006.01)

(52) U.S. Cl.
CPC .................... *G06F 3/04186* (2019.05); *G06F 2203/04106* (2013.01)

(58) Field of Classification Search
CPC ................... G06F 3/04186; G06F 2203/04106
See application file for complete search history.

(56) References Cited

U.S. PATENT DOCUMENTS

| | | | | |
|---|---|---|---|---|
| 5,995,081 A | * | 11/1999 | Kato | G06T 11/203 345/174 |
| 9,501,848 B2 | * | 11/2016 | Wilensky | G06T 11/203 |
| 2012/0194444 A1 | | 8/2012 | Chang et al. | |
| 2014/0098142 A1 | * | 4/2014 | Lee | G06T 11/206 345/676 |
| 2014/0160125 A1 | * | 6/2014 | Yoo | G06T 11/203 345/423 |
| 2015/0325016 A1 | * | 11/2015 | Carr | G06T 11/20 345/442 |
| 2017/0221253 A1 | * | 8/2017 | Banerjee | G06T 11/001 |
| 2018/0033168 A1 | * | 2/2018 | Beri | G06T 3/4084 |
| 2018/0061093 A1 | * | 3/2018 | Liu | G06T 3/0081 |
| 2020/0279542 A1 | | 9/2020 | Minaki et al. | |
| 2022/0121307 A1 | * | 4/2022 | Liu | G06F 3/04883 |

FOREIGN PATENT DOCUMENTS

| | | |
|---|---|---|
| KR | 101171623 B1 | 8/2012 |
| KR | 2018-0010555 A | 1/2018 |

\* cited by examiner

*Primary Examiner* — Afroza Chowdhury
(74) *Attorney, Agent, or Firm* — Polsinelli PC (57) ABSTRACT

A touch sensing apparatus tracking a curve includes an interpolation coordinate generator configured to sense a first touch point, a second touch point and a third touch point, and calculate an interpolation point between the second touch point and the third touch point, wherein the curve is formed by the first touch point, the second touch point, the third touch point and the interpolation point, and the interpolation point is determined by the first touch point, the second touch point and the third touch point.

14 Claims, 9 Drawing Sheets

TOUCH SENSING APPARATUS, TOUCH SENSING DISPLAY SYSTEM INCLUDING THE SAME, AND TOUCH SENSING METHOD

BACKGROUND

1. Technical Field

Embodiments relate to a touch sensing apparatus, a touch sensing display system including the same and a touch sensing method, and more particularly, an MCU which senses a curved line touch, a touch sensing display system including the same and a touch sensing method.

2. Related Art

In general, a display apparatus including a touch screen panel capable of sensing a touch input by a user's finger or a stylus pen is widely used. Such a display apparatus includes a touch sensing apparatus which senses the occurrence of a touch and touch coordinates.

The display apparatus senses a touch when the magnitude of an electrical signal according to a touch exceeds a preset threshold, calculates the location information of a touch point, and performs a relevant function on the basis of the calculated location information.

However, the conventional display apparatus has a problem in that when a user makes a line drawing touch or drags a curve as a touch on the touch screen panel, the curve trajectory of a drawing line or a drag line is not smooth.

SUMMARY

Various embodiments are directed to a touch sensing display system and a touch sensing method capable of precisely predicting the trajectory of a curved touch.

Also, various embodiments are directed to a touch sensing display system and a touch sensing method capable of displaying a smooth curve.

Further, various embodiments are directed to a touch sensing display system and a touch sensing method capable of displaying a smooth curve by calculating interpolation coordinates.

Moreover, various embodiments are directed to a touch sensing display system and a touch sensing method capable of shortening an interpolation coordinate generation time.

In addition, various embodiments are directed to a touch sensing display system and a touch sensing method capable of shortening a time for displaying a smooth curve.

In an embodiment, a touch sensing apparatus tracking a curve may include: an interpolation coordinate generator configured to sense a first touch point, a second touch point and a third touch point, and calculate an interpolation point between the second touch point and the third touch point, wherein the curve is formed by the first touch point, the second touch point, the third touch point and the interpolation point, and the interpolation point is determined by the first touch point, the second touch point and the third touch point.

In an embodiment, a touch sensing apparatus tracking a curve may include: an interpolation coordinate generator configured to set a temporary control point by using a first touch point, a second touch point and a third touch point, set at least one random point by using the temporary control point, set a control point by using the at least one random point, and calculate an interpolation point between the second touch point and the third touch point, by using the control point, wherein the curve which is configured by the first touch point, the second touch point, the interpolation point and the third touch point is tracked.

Accordingly, the touch sensing display system according to the embodiment may precisely predict the trajectory of a curved touch. Also, the touch sensing display system according to the embodiment may display a smooth curve. Moreover, the touch sensing display system according to the embodiment may shorten an interpolation coordinate generation time. In addition, the touch sensing display system according to the embodiment may shorten a time for displaying a smooth curve.

In an embodiment, a touch sensing method tracking a curve may include: sensing a first touch point, a second touch point and a third touch point; and calculating an interpolation point between the second touch point and the third touch point, wherein the curve is formed by the first touch point, the second touch point, the third touch point and the interpolation point, and the interpolation point is determined by the first touch point, the second touch point and the third touch point.

In an embodiment, a touch sensing method tracking a curve may include: setting a temporary control point by using a first touch point, a second touch point and a third touch point; setting at least one random point by using the temporary control point, after the setting of the temporary control point; setting a control point by using the at least one random point; calculating an interpolation point between the second touch point and the third touch point, by using the control point; and tracking the curve which is configured by the first touch point, the second touch point, the interpolation point and the third touch point.

Accordingly, the touch sensing method according to the embodiment may precisely predict the trajectory of a curved touch. Also, the touch sensing method according to the embodiment may display a smooth curve. Moreover, the touch sensing method according to the embodiment may shorten an interpolation coordinate generation time. In addition, the touch sensing method according to the embodiment may shorten a time for displaying a smooth curve.

The touch sensing display system and the touch sensing method according to the embodiments may precisely predict the trajectory of a curved touch.

Also, the touch sensing display system and the touch sensing method according to the embodiments may display a smooth curve.

Further, the touch sensing display system and the touch sensing method according to the embodiments may display a smooth curve by calculating interpolation coordinates.

Moreover, the touch sensing display system and the touch sensing method according to the embodiments may shorten an interpolation coordinate generation time.

In addition, the touch sensing display system and the touch sensing method according to the embodiments may shorten a time for displaying a smooth curve.

DETAILED DESCRIPTION

Hereinafter, a display system in accordance with an embodiment will be described with reference to FIG. 1.

Figure 1:
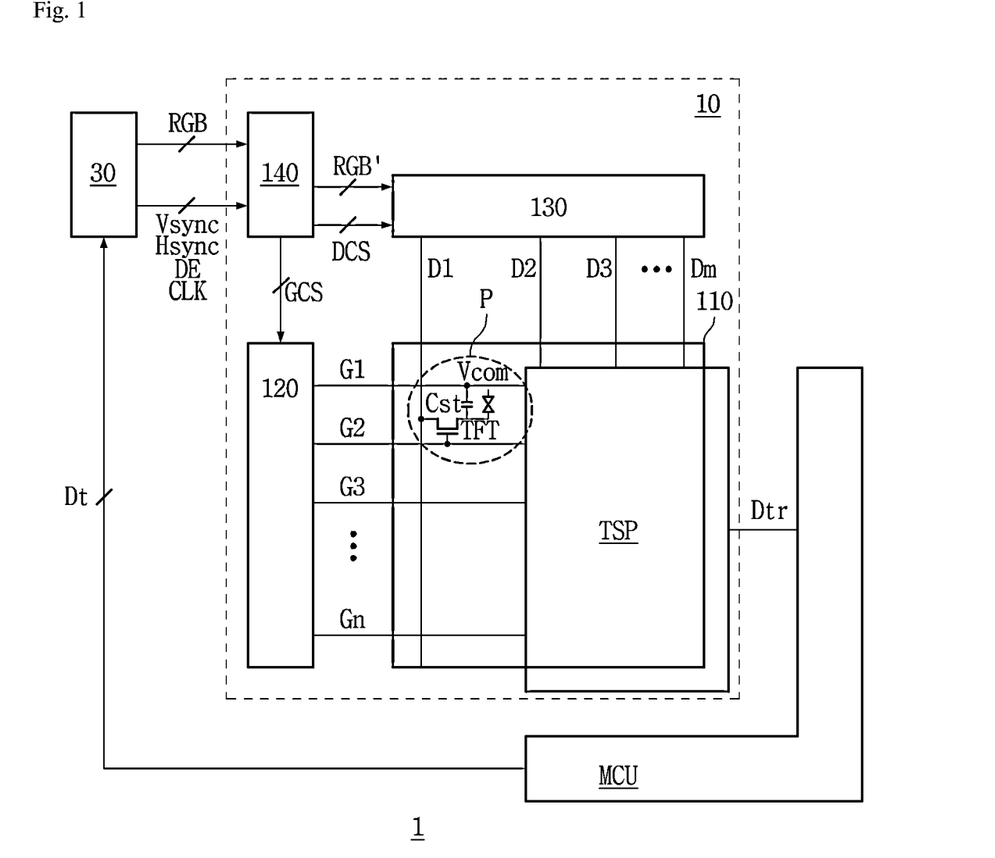
FIG. 1 is a diagram illustrating a display system including a touch sensing apparatus in accordance with an embodiment.

FIG. 1 is a diagram illustrating a display system including a touch sensing apparatus in accordance with an embodiment.

Referring to FIG. 1, a display system 1 in accordance with an embodiment includes a display apparatus 10, a micro controller unit MCU and a host apparatus 30.

The display apparatus 10 includes a display panel 110, a gate driver 120, a data driver 130, a timing controller 140 and a touch screen panel TSP.

The display panel 110 includes a plurality of gate lines G1 to Gn and a plurality of data lines D1 to Dm which are arranged to intersect with each other so as to define a plurality of pixel regions P, and pixels which are disposed in the plurality of pixel regions P, respectively. The plurality of gate lines G1 to Gn may be arranged in a horizontal direction, and the plurality of data lines D1 to Dm may be arranged in a vertical direction. However, the embodiment is not limited thereto. The display panel 110 may be a liquid crystal display (LCD) panel. The display panel 110 includes thin film transistors TFT which are formed in the plurality of pixel regions P, respectively, defined by the plurality of gate lines G1 to Gn and the plurality of data lines D1 to Dm, and a plurality of pixels which are electrically connected to the thin film transistors TFT, respectively.

The thin film transistors TFT supply data signals, supplied through the plurality of data lines D1 to Dm, to the corresponding pixels according to scan signals supplied through the plurality of gate lines G1 to Gn.

The pixel may be a liquid crystal cell including a common electrode and a sub pixel electrode connected to the thin film transistor TFT, which face each other with a liquid crystal interposed therebetween. The pixel may be equivalently represented by a liquid crystal capacitor $C_{1c}$. The pixel includes a storage capacitor Cst which is connected to the gate line of a previous stage to maintain a source signal charged in the liquid crystal capacitor $C_{1c}$ until a next source signal is charged.

Meanwhile, the pixel region of the display panel 110 may be configured by red, green, blue and white subpixels. In an embodiment, the respective subpixels may be repeatedly formed in a row direction or may be formed in a 2*2 matrix form. A color filter corresponding to each color is disposed in each of the red, green and blue subpixels, but a separate color filter is not disposed in the white subpixel. In an embodiment, the red, green, blue and white subpixels may be formed at the same area ratio, but may be formed at different area ratios.

The gate driver 120 includes a shift register which sequentially generates a scan signal, that is, a gate signal of an enable level, according to a gate control signal GCS of the timing controller 140. The thin film transistor TFT is turned on according to the scan signal of the enable level. The gate driver 120 may be disposed on one side of the display panel 110, for example, the left side of the display panel 110. However, the embodiment is not limited thereto, and the gate driver 120 may be disposed on the left and right sides of the display panel 110 to face each other. The gate driver 120 may include a plurality of gate driver integrated circuits (ICs) (not illustrated). The gate driver 120 may be implemented in the form of a tape carrier package in which the gate driver ICs are mounted. However, the embodiment is not limited thereto, and the gate driver ICs may be directly mounted to the display panel 110.

The data driver 130 converts an image data signal of the timing controller 140 into an analog source signal, and outputs the analog source signal to the display panel 110. In detail, the data driver 130 outputs the analog source signal to each of the plurality of data lines D1 to Dm in response to a data control signal DCS of the timing controller 140. The data driver 130 may be disposed on one side of the display panel 110, for example, the top side of the display panel 110. However, the embodiment is not limited thereto, and the data driver 130 may be disposed on one side and the other side, for example, both the top and bottom sides, of the display panel 110 to face each other. The data driver 130 may include a plurality of source driver ICs (not illustrated) each of which converts an image data signal transmitted from the timing controller 140 into an analog source signal and outputs the analog source signal to the display panel 110.

The data driver 130 may be implemented in the form of a tape carrier package in which the source driver ICs are mounted, but the embodiment is not limited thereto.

The timing controller 140 may receive a timing signal including a vertical synchronization signal Vsync, a horizontal synchronization signal Hsync, a data enable signal DE and a clock signal CLK of the host apparatus 30. The timing controller 140 generates the data control signal DCS for controlling the data driver 130 and the gate control signal GCS for controlling the gate driver 120.

The data control signal DCS may include a source start pulse (SSP), a source sampling clock (SSC) and a source output enable signal (SOE). The source start pulse (SSP) controls the data sampling start timing of the plurality of source driver ICs (not illustrated) configuring the data driver 130. The source sampling clock (SSC) is a clock signal which controls data sampling timing in each of the source driver ICs. The source output enable signal (SOE) controls the output timing of each source driver IC.

The gate control signal GCS may include a gate start pulse (GSP), a gate shift clock (GSC) and a gate output enable signal (GOE). The gate start pulse (GSP) controls the operation start timing of the plurality of gate driver ICs (not illustrated) configuring the gate driver 120. The gate shift clock (GSC), as a clock signal which is inputted in common to at least one gate driver IC, controls the shift timing of a scan signal (a gate pulse). The gate output enable signal (GOE) specifies the timing information of at least one gate driver IC.

The timing controller 140 receives an image data signal RGB from the host apparatus 30, converts the image data signal RGB into an image data signal RGB' of a form capable of being processed by the data driver 130, and outputs the converted image data signal RGB'.

The touch screen panel TSP may sense a touch on the touch screen panel TSP. The touch screen panel TSP may generate touch sensing raw data (hereinafter, referred to as sensing data) Dtr by using the sensed touch. The sensing data Dtr may include an amount of change in the capacitance of a corresponding touch electrode Et (see FIG. 2), but the embodiment is not limited thereto.

A frequency at which a new image data signal is transmitted to all of a plurality of pixels included in the display panel 110 is referred to as a display frame rate. Also, a frequency at which the touch screen panel TSP transmits the sensing data Dtr to the MCU is referred to as a touch report rate. When the touch report rate is higher than the display frame rate, the transmission speed of touch data Dt increases. Therefore, in proportion to the touch report rate compared to the display frame rate, the touch sensitivity felt by a user may increase, and a touch input may be more finely expressed. Touch coordinates refer to the coordinates of a touch corresponding to a touch on the touch screen panel TSP. The detailed configuration of the touch screen panel TSP will be described later.

The MCU may calculate an interpolation point Pi by using at least two touch coordinates among a plurality of touch coordinates included in the sensing data Dtr. The MCU may calculate interpolation coordinates corresponding to the interpolation point Pi. The MCU may track a curved touch by using at least two touch coordinates and interpolation coordinates, and may generate the touch data Dt including the touch coordinates and/or coordinate data obtained by correcting the touch coordinates. A detailed method for the MCU to generate the touch data Dt by using the sensing data Dtr will be described later.

The host apparatus 30 may be implemented as any one of a navigation system, a set-top box, a DVD player, a Blu-ray player, a personal computer (PC), a home theater system, a broadcast receiver and a phone system, but the embodiment is not limited thereto. The host apparatus 30 may include a system on chip (SoC) having a built-in scaler. The host apparatus 30 converts the image data signal RGB corresponding to an input image into a format suitable for being displayed on the display panel 110. The host apparatus 30 may transmit the image data signal RGB and a plurality of timing signals to the timing controller 140. The host apparatus 30 may analyze the touch coordinates by using the plurality of touch data Dt, and may generate the image data signal RGB such that the touch coordinates are outputted in a line form onto the display panel 110. The host apparatus 30 may execute an application program related with coordinates where a touch is made by a user, but the embodiment is not limited thereto.

Hereinafter, a touch screen panel according to an embodiment will be described in detail with reference to FIG. 2.

Figure 2:
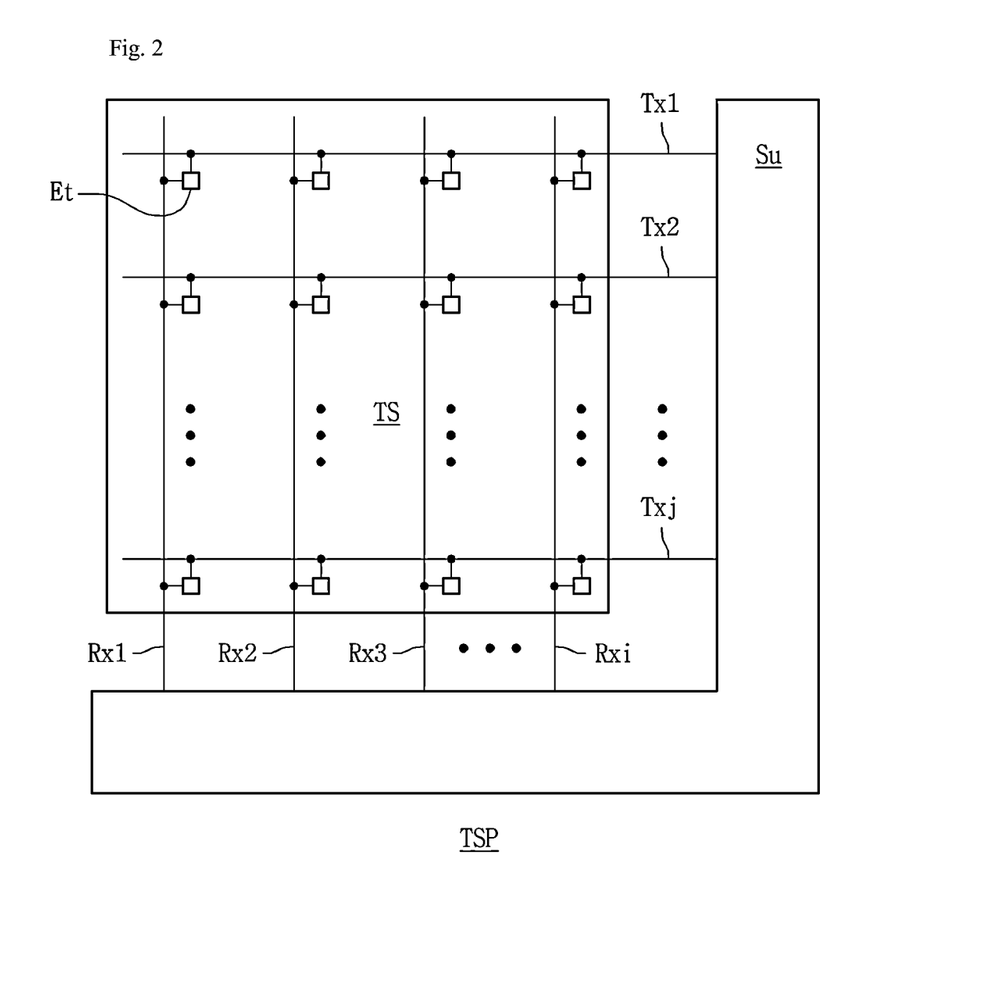
FIG. 2 is a diagram schematically illustrating the configuration of a touch screen panel in accordance with an embodiment.

FIG. 2 is a diagram schematically illustrating the configuration of a touch screen panel in accordance with an embodiment.

Referring to FIG. 2, the touch screen panel TSP includes a touch screen TS and a touch sensing apparatus Su. The touch screen panel TSP may be implemented in a form built in the display panel 110. For example, the touch screen panel TSP may be disposed in an on-cell type or an in-cell type in the display panel 110. A user's touch is inputted on the touch screen panel TSP.

The touch screen TS includes a plurality of touch driving lines Tx1 to Txj (j is a natural number equal to or greater than 2), a plurality of touch sensing lines Rx1 to Rxi (i is a natural number equal to or greater than 2), and the plurality of touch electrodes Et each of which is connected to a corresponding touch driving line among the plurality of touch driving lines Tx1 to Txj and a corresponding touch sensing line among the plurality of touch sensing lines Rx1 to Rxi. A touch driving signal of the touch sensing apparatus Su may be transmitted to the touch electrodes Et corresponding to the plurality of touch driving lines Tx1 to Txj. The plurality of touch sensing lines Rx1 to Rxi may transmit the touch electrode voltages (or charges) of the plurality of touch driving lines Tx1 to Txj to the touch sensing apparatus Su. The touch electrode Et may be formed as a mutual capacitor.

The touch sensing apparatus Su may supply the touch driving signal to each of the plurality of touch electrodes Et. The touch sensing apparatus Su may drive the plurality of touch electrodes Et by using the touch driving signal. The touch sensing apparatus Su may sense a change in the capacitance of the touch electrode Et that occurs according to a touch. The touch sensing apparatus Su may sense a change in the capacitance of at least one touch electrode Et which is touched, through a touch sensing line corresponding to the touch electrode Et among the plurality of touch sensing lines Rx1 to Rxi. The touch sensing apparatus Su may generate the sensing data Dtr including information on the sensed capacitance change.

For the sake of convenience in explanation, it has been described that the touch screen TS is a mutual capacitance type touch screen TS including the plurality of touch driving lines Tx1 to Txj and the plurality of touch sensing lines Rx1 to Rxi, but the embodiment is not limited thereto. As the touch screen TS, a self capacitance type touch screen, in which a touch driving signal and a sensing signal corresponding to a change in capacitance occurring according to a touch are implemented through the touch sensing lines Rx1 to Rxi, may be applied. In the embodiment, a touch may be a touch of a user's finger, a touch of a user's hand or a touch of a stylus pen, but the embodiment is not limited thereto.

Hereinafter, a touch sensing apparatus in accordance with an embodiment will be described in detail with reference to FIG. 3.

Figure 3:
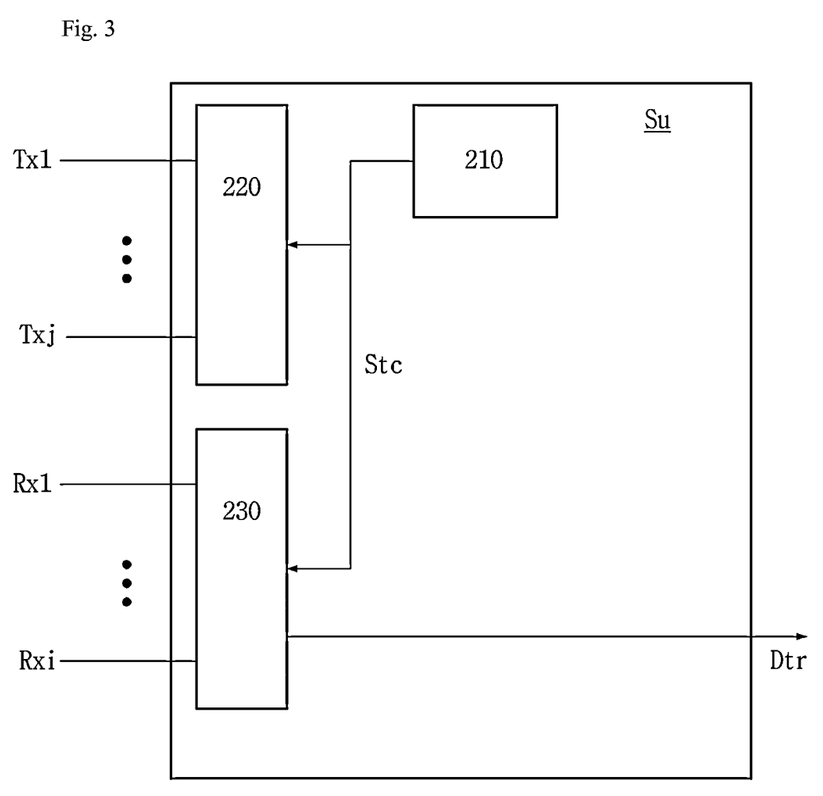
FIG. 3 is a block diagram illustrating the configuration of a touch sensing apparatus in accordance with an embodiment.

FIG. 3 is a block diagram illustrating the configuration of a touch sensing apparatus in accordance with an embodiment.

Referring to FIG. 3, the touch sensing apparatus Su in accordance with the embodiment may include a touch controller 210, a touch driver 220 and a touch sensor 230.

The touch controller 210 may generate a touch control signal Stc which controls the touch driver 220 and the touch sensor 230. The touch controller 210 may generate a plurality of timing control signals (not illustrated) for controlling the operation timing of the touch driver 220 and the touch sensor 230, respectively.

The touch driver 220 selects a touch driving line to which a touch driving signal is to be applied, among the plurality of touch driving lines Tx1 to Txj, according to the touch control signal Stc, and supplies the touch driving signal to the selected touch driving line.

The touch sensor 230 receives the voltages of the plurality of touch electrodes Et through the plurality of touch sensing lines Rx1 to Rxi, respectively, according to the touch control signal Stc. The touch sensor 230 may select a touch sensing line corresponding to a touch, and may receive the signal of a touch electrode Et connected to the selected touch sensing line among the plurality of touch electrodes Et. The touch sensor 230 samples the received signals of the plurality of touch electrodes Et, and accumulates the received signals in an integrator (not illustrated). The touch sensor 230 may input the signals accumulated in the integrator to an analog-to-digital converter (ADC) (not illustrated). The ADC may generate the sensing data Dtr by using the inputted accumulated signals.

The touch controller 210, the touch driver 220 and the touch sensor 230 may be integrated into one touch readout integrated circuit, but the embodiment is not limited thereto.

Hereinafter, an MCU in accordance with an embodiment will be described in detail with reference to FIG. 4.

Figure 4:
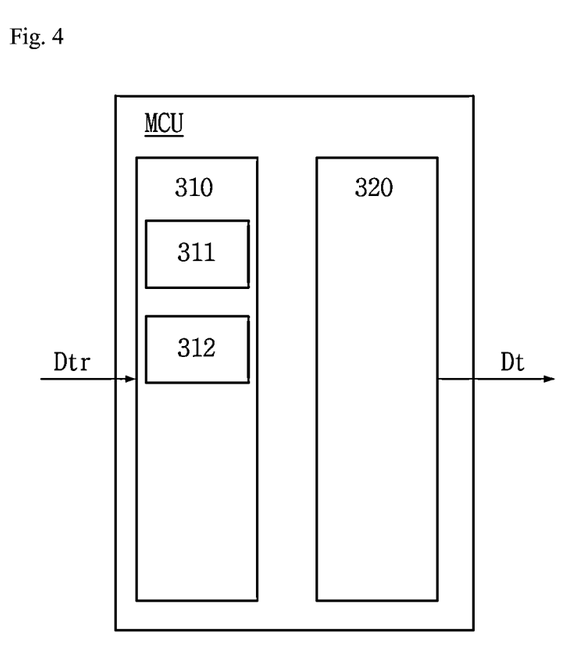
FIG. 4 is a block diagram illustrating the configuration of an MCU in accordance with an embodiment.

FIG. 4 is a block diagram illustrating the configuration of an MCU in accordance with an embodiment.

Referring to FIG. 4, the MCU in accordance with the embodiment includes a coordinate calculator 310 and an interpolation coordinate generator 320.

The coordinate calculator 310 calculates the coordinates of a touch on the touch screen panel TSP by using the sensing data Dtr. The coordinate calculator 310 includes a data reception unit 311 and a touch intensity calculation unit 312.

The data reception unit 311 may receive the sensing data Dtr.

The touch intensity calculation unit 312 may compare the sensing data Dtr and preset reference data. The touch intensity calculation unit 312 may calculate the difference between the sensing data Dtr and the reference data by using a comparison result. The touch intensity calculation unit 312 may calculate the touch intensity of each of the plurality of touch electrodes Et by using the sensing data Dtr. The touch intensity may be the intensity of the voltage of a touch signal sensed from each touch electrode Et, but the embodiment is not limited thereto.

The interpolation coordinate generator 320 may calculate an interpolation point Pi between two touch points by using at least two sensed touches, and may calculate interpolation coordinates corresponding to the interpolation point Pi. A detailed method for the interpolation coordinate generator 320 to calculate interpolation coordinates will be described later.

Hereinafter, a method for an interpolation coordinate generator to calculate interpolation coordinates in accordance with an embodiment will be described in detail with reference to FIGS. 5 to 8.

FIGS. 5 to 8 are diagrams for explaining a method for an interpolation coordinate generator to calculate interpolation coordinates in accordance with an embodiment.

Figure 5:
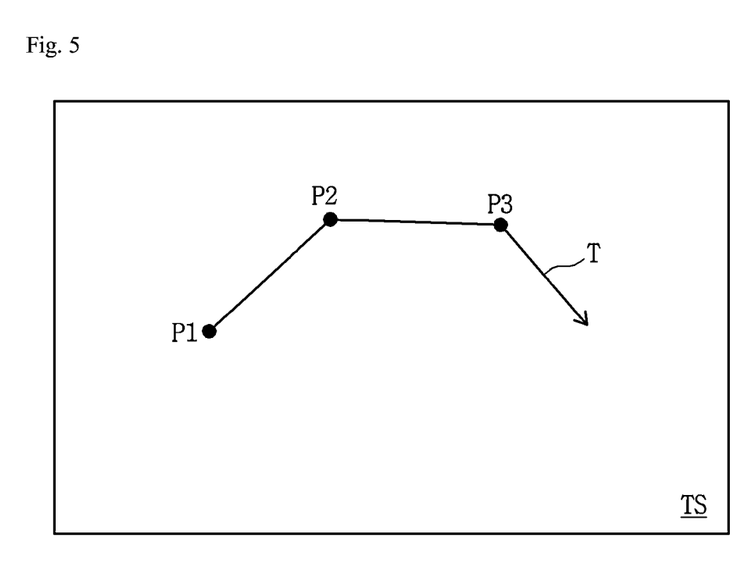
FIGS. 5 to 8 are diagrams for explaining a method for an interpolation coordinate generator to calculate interpolation coordinates in accordance with an embodiment.

Referring to FIG. 5, the interpolation coordinate generator 320 senses at least one touch point on the touch screen TS by using the sensing data Dtr. The sensed at least one touch point may be included in a touch T. For example, the interpolation coordinate generator 320 may sense a first touch point P1 included in the touch T. The first touch point P1 may be sensed at a first time point. The touch T may form a curved drawing touch or a curved drag touch, but the embodiment is not limited thereto. The interpolation coordinate generator 320 may calculate the coordinates of a touch point by using the first touch point P1.

Also, the interpolation coordinate generator 320 may sense the first touch point P1 and a second touch point P2 included in the touch T. The first touch point P1 may be sensed at the first time point. The second touch point P2 may be sensed at a second time point. The first touch point P1 and the second touch point P2 may form the touch T. The interpolation coordinate generator 320 may calculate the coordinates of a touch point by using the first touch point P1. When the second touch point P2 is not sensed after the first time point, the interpolation coordinate generator 320 may generate the touch data Dt including the coordinates of the first touch point P1.

When the second touch point P2 is sensed after the first time point, the interpolation coordinate generator 320 may calculate the interpolation point Pi (see FIG. 8) by using the first touch point P1 and the second touch point P2. For example, the interpolation coordinate generator 320 may sense the first touch point P1 and the second touch point P2 included in the touch T. The first touch point P1 may be sensed at the first time point. The second touch point P2 may be sensed at the second time point. The first touch point P1 and the second touch point P2 may be sensed according to the order of the first time point and the second time point, respectively. The first touch point P1 and the second touch point P2 may form a curved drawing touch or a curved drag touch. The interpolation coordinate generator 320 may calculate the interpolation point Pi (see FIG. 8) by using the first touch point P1 and the second touch point P2.

In detail, the interpolation coordinate generator 320 may calculate the interpolation point Pi by applying the first touch point P1 and the second touch point P2 to Equation 1 below.

$$Pi = \frac{(P1 + P2)}{2} \qquad \text{[Equation 1]}$$

In Equation 1, P1 is the first touch point P1, and P2 is the second touch point P2.

The interpolation coordinate generator 320 may calculate interpolation coordinates corresponding to the interpolation point Pi. The interpolation coordinate generator 320 may generate the touch data Dt including the interpolation coordinates.

In addition, the interpolation coordinate generator 320 may sense the first touch point P1, the second touch point P2 and a third touch point P3 included in the touch T.

The first touch point P1 may be sensed at the first time point. The second touch point P2 may be sensed at the second time point. The third touch point P3 may be sensed at a third time point. The first touch point P1, the second touch point P2 and the third touch point P3 may be sensed according to the order of the first time point, the second time point and the third time point, respectively. The third time point may correspond to a current frame of the display panel 110, the second time point may correspond to a first previous frame of the display panel 110, and the first time point may correspond to a second previous frame of the display panel 110. The current frame may be an Nth frame, the first previous frame may be an (N−1)th frame, and the second previous frame may be an (N−2)th frame. The first touch point P1, the second touch point P2 and the third touch point P3 may form a curved drawing touch or a curved drag touch. A detailed method for the interpolation coordinate generator 320 to calculate interpolation coordinates by using the first touch point P1, the second touch point P2 and the third touch point P3 will be described later.

For the sake of convenience in explanation, FIG. 5 illustrates the trajectory of the touch T including the first touch point P1, the second touch point P2 and the third touch point P3 as a straight line, but the embodiment is not limited thereto. The first touch point P1, the second touch point P2 and the third touch point P3 may be touch points forming a drawing line curve and/or a drag line curve.

Figure 6:
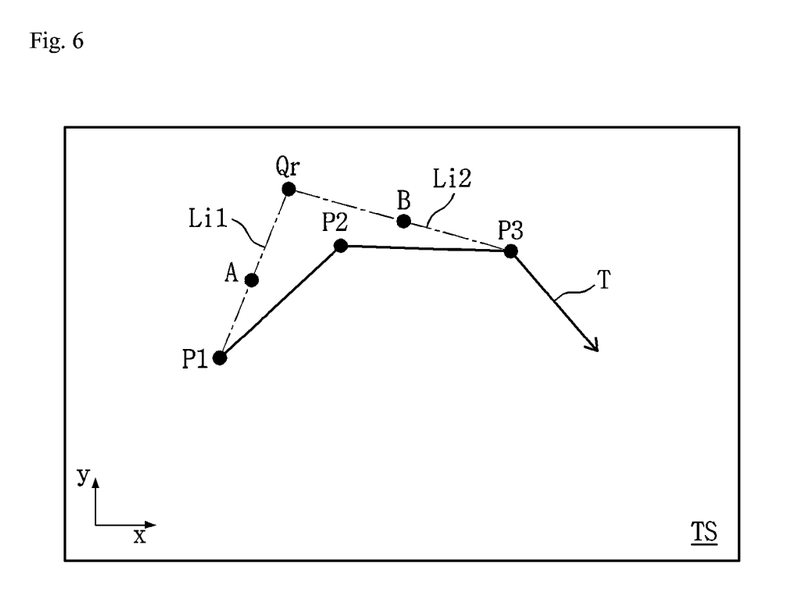

Referring to FIG. 6, the interpolation coordinate generator 320 may set an estimated control point Qr which is positioned above a highest point among the first touch point P1, the second touch point P2 and the third touch point P3 on the touch screen TS. The estimated control point Qr may correspond to the position of the second touch point P2. For example, the interpolation coordinate generator 320 may set one side of the touch screen TS (e.g., the bottom side of the touch screen TS) as a reference. The interpolation coordinate generator 320 may set the estimated control point Qr at a position higher than the second touch point P2 farthest away from the reference in a first direction (e.g., a y-axis direction) among the first touch point P1, the second touch point P2 and the third touch point P3.

The interpolation coordinate generator 320 may set a first random point A. For example, the first random point A may be an arbitrary point moving on a first straight line Li1 which connects the estimated control point Qr and the first touch point P1. That is to say, the first random point A may move on the first straight line Li1 between the first touch point P1 and the estimated control point Qr. The first random point A may move at a constant velocity on the first straight line Li1. In other words, the acceleration of the first random point A is zero.

The first random point A may be defined by Equation 2 below.

$$A=(1-t)P1+Qrt \quad \text{[Equation 2]}$$

In Equation 2, t is a parameter that has a value between 0 and 1, P1 is the first touch point P1, and Qr is the estimated control point Qr.

The first random point A may be positioned at the first touch point P1 at a time point corresponding to t=0. The first random point A may be positioned at the estimated control point Qr at a time point corresponding to t=1. Accordingly, the first random point A may move between the first touch point P1 and the estimated control point Qr on the first straight line Li1 according to the value of t. The first random point A may move at a constant velocity on the first straight line Li1. In other words, the acceleration of the first random point A is zero.

The interpolation coordinate generator 320 may set a second random point B. For example, the second random point B is an arbitrary point moving on a second straight line Li2 which connects the estimated control point Qr and the third touch point P3. Namely, the second random point B may move between the estimated control point Qr and the third touch points P3. The second random point B may be defined by Equation 3 below.

$$B=(1-t)Qr+tP3 \quad \text{[Equation 3]}$$

In Equation 3, t is a parameter that has a value between 0 and 1, Qr is the estimated control point, and P3 is the third touch point P3.

The second random point B is positioned at the estimated control point Qr at a time point corresponding to t=0, and is positioned at the third touch point P3 at a time point corresponding to t=1. Accordingly, the second random point B may move between the estimated control point Qr and the third touch point P3 on the second straight line Li2 according to the value of t.

Figure 7:
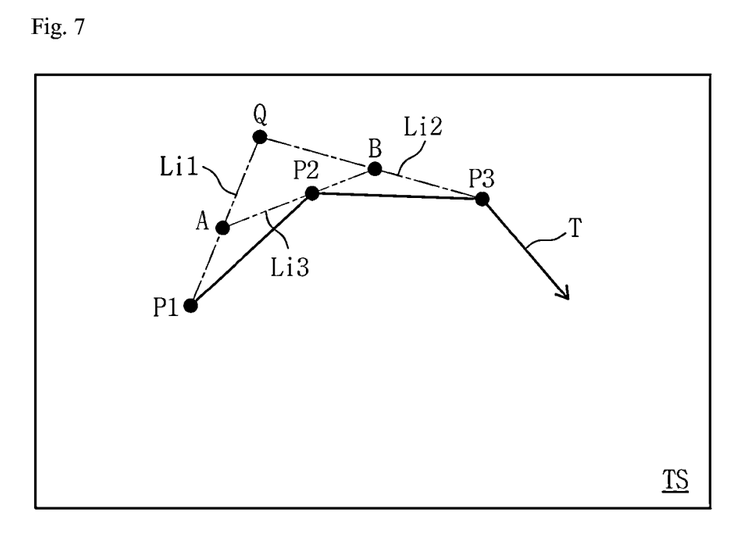

Referring to FIG. 7, the interpolation coordinate generator 320 may set a third straight line Li3 which connects the first random point A and the second random point B. The second touch point P2 may move on the third straight line Li3, and may be defined by Equation 4 below.

$$P2=(1-t)A+tB \quad \text{[Equation 4]}$$

In Equation 4, t is a parameter that has a value between 0 and 1. A is the first random point A, and B is the second random point B. Accordingly, the position of the second touch point P2 may be determined according to the parameter t, the position of the first random point A and the position of the second random point B.

The interpolation coordinate generator 320 sets the parameter t as a first parameter (e.g., t=0.5), and calculates a control point Q by using the following Equation 5 obtained by applying the first parameter to Equation 4.

$$\begin{aligned} P2 &= A/2 + B/2 \\ &= (P3/2 + Qr/2)/2 + (Qr/2 + P1/2)/2 \\ &= Q/2 + P3/4 + P1/4 \end{aligned} \quad \text{[Equation 5]}$$

$$Q = 2P2 - (P1+P3)/2$$

In Equation 5, P1 is the first touch point P1, P2 is the second touch point P2, and P3 is the third touch point P3.

Accordingly, the control point Q may be set according to the value of the first parameter, the position of the first random point A and the position of the second random point B, and may be set according to the positions of the first touch point P1, the second touch point P2 and the third touch point P3.

Figure 8:
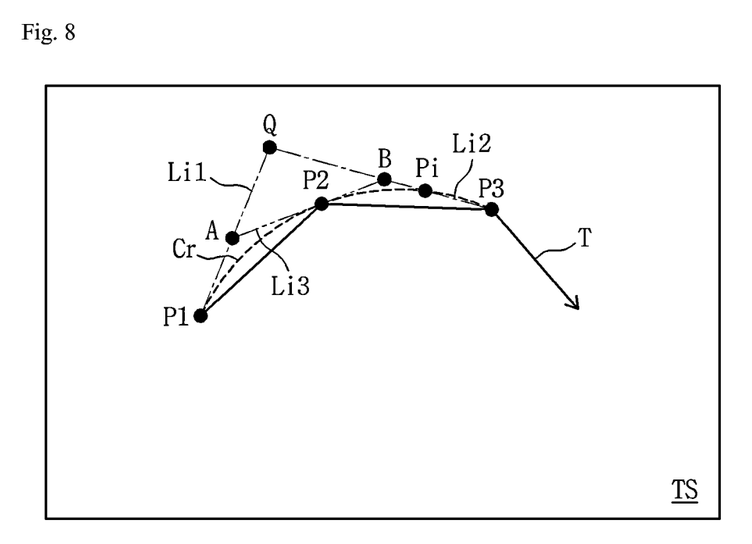

Referring to FIG. 8, the interpolation coordinate generator 320 may assume the parameter t as a second parameter (e.g., t=0.75), and may calculate the interpolation point Pi by applying the second parameter and the control point Q to Equation 6 below.

$$\begin{aligned} Pi &= (1-t)A + tB \\ &= A/4 + B^*3/4 \\ &= (P3/4 + 3Q/4)/4 + (Q/4 + P1^*3/4)^*3/4 \\ &= (P3 + 6Q + 9P1)/16 \\ &= [P3 + 6(2P2 - (P1+P3)/2) + 9P1]/16 \\ &= (P3 + 12P2 - 3P3 - 3P3 + 9P1)/16 \\ &= (6P1 + 12P2 - 2P3)/16 \\ &= (3(P1 + 2P2) - P3)/8 \end{aligned} \quad \text{[Equation 6]}$$

In Equation 6, A is the first random point A, B is the second random point B, P1 is the first touch point P1, P2 is the second touch point P2, and P3 is the third touch point P3. Accordingly, the position of the interpolation point Pi may be set according to the control point Q and the second parameter. That is to say, the position of the interpolation point Pi may be determined according to the first touch point P1, the second touch point P2, the third touch point P3 and the second parameter.

Also, the interpolation coordinate generator 320 may calculate the interpolation point Pi by applying the second parameter and the control point Q to the following Equation 7 being a shift calculation equation.

$$Pi=(3^*(P1+(P2<<1))-P3)>>3 \quad \text{[Equation 7]}$$

In Equation 7, P1 is the first touch point P1, P2 is the second touch point P2, and P3 is the third touch point P3.

By calculating the interpolation point Pi using Equation 6, the interpolation coordinate generator 320 may calculate the interpolation point Pi only by performing once a multiplication that requires a long calculation time and performing remaining addition, subtraction and shift calculations, whereby quick calculation is possible.

By calculating the touch coordinates of each of the first touch point P1, the second touch point P2, the interpolation point Pi and the third touch point P3, the interpolation coordinate generator 320 may generate the coordinates of a curve Cr by the unit of frame. The curve Cr is configured by the first touch point P1, the second touch point P2, the interpolation point Pi and the third touch point P3. The curve Cr may be a Bezier curve that is determined according to the control point Q. The Bezier curve may be a curve in a direction extending from the first touch point P1 to the third touch point P3.

By calculating the coordinates of the curve Cr including the first touch point PT, the second touch point P2, the interpolation point Pi and the third touch point P3 by using the interpolation point Pi, the interpolation coordinate generator 320 may track the curve Cr. The interpolation coordinate generator 320 may calculate the coordinates of the first touch point P1 at the first time point, and may calculate the coordinates of the second touch point P2 at the second time point. The interpolation coordinate generator 320 may calculate the coordinates of the third touch point P3 at the third time point. The interpolation coordinate generator 320 may calculate the interpolation point Pi and calculate the interpolation coordinates before the third time point (e.g., between the second time point and the third time point). The interpolation coordinate generator 320 may calculate the coordinates of each of the first touch point P1, the second touch point P2, the third touch point P3 and the interpolation point Pi by the unit of frame.

For the sake of convenience in explanation, the curve Cr has been described as a Bezier curve, but the embodiment is not limited thereto. The curve Cr may be any curve as long as it is a parameter curve.

As described above, the interpolation coordinate generator 320 in accordance with the embodiment may set the estimated control point Qr by using the first touch point P1, the second touch point P2 and the third touch point P3, and then, may generate the control point Q by using the first parameter and the estimated control point Qr. The interpolation coordinate generator 320 may calculate the interpolation point Pi by using the second parameter and the control point Q. The interpolation coordinate generator 320 may calculate the coordinates of the Bezier curve Cr including the first touch point P1, the second touch point P2, the interpolation point Pi and the third touch point P3.

Accordingly, the MCU in accordance with the embodiment may set the estimated control point Qr by using three touch coordinates included in the curve Cr. The MCU calculates the control point Q after sensing the second touch point P2 corresponding to the estimated control point Qr. The MCU may calculate the coordinates of the interpolation point Pi on the curve Cr by using the control point Q.

The MCU may quickly calculate the interpolation point Pi only by performing once a multiplication that requires a long calculation time and performing remaining addition, subtraction and shift calculations. Therefore, the MCU may quickly track a curved drawing touch or a curved drag touch as a smooth curve.

Hereinafter, a touch sensing method in accordance with an embodiment will be described with reference to FIG. 9.

Figure 9:
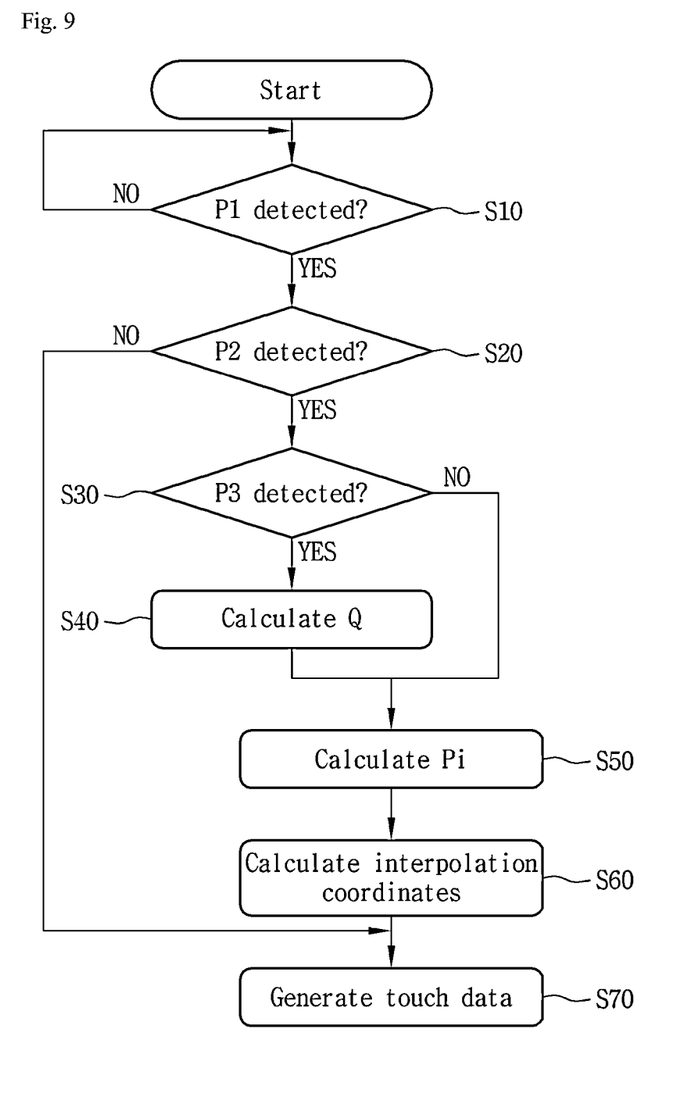
FIG. 9 is a flowchart illustrating a touch sensing method in accordance with an embodiment.

FIG. 9 is a flowchart illustrating a touch sensing method in accordance with an embodiment.

At step S10, the MCU senses a touch to each of the plurality of touch electrodes Et in correspondence to a touch on the touch screen panel TSP, and generates the sensing data Dtr. The MCU determines whether the first touch point P1 is sensed, by using the sensing data Dtr.

At step S20, when the first touch point P1 is sensed, the MCU determines whether the second touch point P2 is sensed, by using the sensing data Dtr.

At step S30, when the second touch point P2 is sensed, the MCU determines whether the third touch point P3 is sensed, by using the sensing data Dtr.

At step S40, when the first touch point P1, the second touch point P2 and the third touch point P3 are sensed, the MCU sets one side of the touch screen TS as a reference. The MCU sets the estimated control point Qr at a position higher than the second touch point P2 positioned farthest away from the reference in the first direction among the first touch point P1, the second touch point P2 and the third touch point P3 on the touch screen TS. The MCU sets the first random point A moving at a constant speed on the first straight line Li1 and the second random point B moving at a constant speed on the second straight line Li2. The MCU sets the third straight line Li3 which connects the first random point A and the second random point B. The second touch point P2 may move on the third straight line Li3. The MCU calculates the control point Q by applying the first parameter to Equation 5.

At step S50, when only the first touch point P1 and the second touch point P2 are sensed, the MCU calculates the interpolation point Pi by applying the sensed first touch point P1 and the sensed second touch point P2 to Equation 1. Also, the MCU calculates the interpolation point Pi by applying the second parameter and the control point Q to Equation 6.

At step S60, the MCU calculates interpolation coordinates corresponding to the interpolation point Pi.

At step S70, the MCU generates the touch data Dt including the coordinates of the first touch point P1 and/or interpolation coordinate data.

Accordingly, the MCU in accordance with the embodiment may calculate the control point Q by using three touch coordinates on the curve Cr, and may calculate the coordinates of the interpolation point Pi on the curve Cr by using the control point Q. The MCU may quickly calculate the interpolation point Pi only by performing once a multiplication that requires a long calculation time and performing remaining addition, subtraction and shift calculations.

Therefore, the touch sensing method in accordance with the embodiment may quickly track a curved drawing touch or a curved drag touch as a smooth curve.

What is claimed is:

1. A touch sensing apparatus tracking a curve, comprising:
   an interpolation coordinate generator configured to sense a first touch point, a second touch point and a third touch point, and calculate an interpolation point between the second touch point and the third touch point based on a control point,
   wherein the curve is formed by the first touch point, the second touch point, the third touch point and the interpolation point and contacts the first touch point, the second touch point, and the third touch point,
   the interpolation point is determined by the first touch point, the second touch point and the third touch point, and
   the interpolation coordinate generator further configured to:
   estimate the control point on a touch screen, and set a first random point between the first touch point and the control point;
   set a second random point between the third touch point and the control point, and
   calculate the interpolation point between the second random point and the third touch point.

2. The touch sensing apparatus according to claim 1, wherein the interpolation coordinate generator further configured to set the control point which is determined by the first random point, the second random point and a parameter, and the second random point is positioned between the control point and the third touch point, and a value of the parameter is a value between 0 and 1.

3. The touch sensing apparatus according to claim 2, wherein the first random point is a point moving on a first straight line according to a value of the parameter, and the first straight line is a straight line which connects the control point and the first touch point.

4. The touch sensing apparatus according to claim 3, wherein the second random point is a point moving on a second straight line according to a value of the parameter, and the second straight line is a straight line which connects the control point and the third touch point.

5. The touch sensing apparatus according to claim 4, wherein the interpolation coordinate generator further configured to set a third straight line which connects the first random point and the second random point, and the second touch point is a touch point moving on the third straight line.

6. The touch sensing apparatus according to claim 5, wherein the parameter includes a first parameter, and a position of the second touch point is determined according to the first parameter, the first random point and the second random point.

7. The touch sensing apparatus according to claim 6, wherein the parameter includes a second parameter, a position of the interpolation point is set according to the control point and a value of the second parameter, and a value of the first parameter is smaller than a value of the second parameter.

8. The touch sensing apparatus according to claim 7, wherein the first random point is positioned at the first touch point at a first time point, and is positioned at the control point at a second time point, and the first time point is a time point when a value of the parameter is 0, and the second time point is a time point when a value of the parameter is 1.

9. The touch sensing apparatus according to claim 8, wherein the second random point is positioned at the control point at the first time point, and is positioned at the first touch point at the second time point.

10. The touch sensing apparatus according to claim 9, wherein the curve is a Bezier curve that is determined according to the control point, and the Bezier curve is a curve in a direction extending from the first touch point to the third touch point.

11. A touch sensing method tracking a curve, comprising:

sensing a first touch point, a second touch point and a third touch point; and calculating an interpolation point between the second touch point and the third touch point based on a control point, wherein the curve is formed by the first touch point, the second touch point, the third touch point and the interpolation point and contacts the first touch point, the second touch point, and the third touch point, the interpolation point is determined by the first touch point, the second touch point and the third touch point, and wherein the calculating of the interpolation point comprises:

estimating the control point on a touch screen;

setting a first random point between the first touch point and the control point;

setting a second random point between the third touch point and the control point; and calculating the interpolation point between the second random point and the third touch point.

12. The touch sensing method according to claim 11, further comprising:

setting the control point which is determined by the first random point, the second random point and a parameter, wherein the second random point is positioned between the control point and the third touch point, and a value of the parameter is a value between 0 and 1.

13. The touch sensing method according to claim 12, wherein the setting of the control point comprises:

setting the first random point moving on a first straight line according to the parameter;

setting the second random point moving on a second straight line according to the parameter; and setting the control point which is determined by the first random point, the second random point and the parameter, wherein the first straight line is a straight line which connects the control point and the first touch point, and the second straight line is a straight line which connects the control point and the third touch point.

14. The touch sensing method according to claim 13, wherein the curve is a Bezier curve that is determined according to the control point, and the Bezier curve is a curve in a direction extending from the first touch point to the third touch point.

* * * * *